US012734095B2

(12) United States Patent
Ma

(10) Patent No.: US 12,734,095 B2
(45) Date of Patent: Sep. 15, 2026

(54) MASSAGE DEVICE

(71) Applicant: SHENZHEN MOZA TECHNOLOGY CO., LIMITED, Shenzhen (CN)

(72) Inventor: Jinhui Ma, Shenzhen (CN)

(73) Assignee: SHENZHEN MOZA TECHNOLOGY CO., LIMITED, Shenzhen (CN)

( * ) Notice: Subject to any disclaimer, the term of this patent is extended or adjusted under 35 U.S.C. 154(b) by 735 days.

(21) Appl. No.: 18/196,456

(22) Filed: May 12, 2023

(65) Prior Publication Data

US 2024/0156667 A1 May 16, 2024

(30) Foreign Application Priority Data

Nov. 14, 2022 (CN) ......................... 202211427201.0

(51) Int. Cl.
*A61H 7/00* (2006.01)

(52) U.S. Cl.
CPC ........... *A61H 7/00* (2013.01); *A61H 2205/04* (2013.01)

(58) Field of Classification Search
CPC ......... A61H 7/00; A61H 2205/04; A61H 1/00
See application file for complete search history.

(56) References Cited

FOREIGN PATENT DOCUMENTS

| | | | | | |
|---|---|---|---|---|---|
| CN | 208424705 | U | | 1/2019 | |
| CN | 109350476 | A | * | 2/2019 | ......... A61H 15/0078 |
| CN | 109954226 | A | * | 7/2019 | ............... A61N 2/06 |
| CN | 110339034 | A | * | 10/2019 | ............... A61H 7/00 |
| CN | 110882481 | A | * | 3/2020 | ......... A61N 1/36014 |
| CN | 111228100 | A | * | 6/2020 | ............. A61H 23/02 |
| CN | 217645517 | U | * | 10/2022 | |
| KR | 20200020377 | A | * | 2/2020 | ............. A61H 7/004 |
| WO | WO-2021103567 | A1 | * | 6/2021 | ............... A61N 1/36 |

* cited by examiner

*Primary Examiner* — Tu A Vo
*Assistant Examiner* — Kelsey E Baller

(57) ABSTRACT

A massage device includes a main body having a massage assembly, a clamp arm connected with the main body, a slider and a support. The slider includes a first end portion and a second end portion spaced apart from the first end portion, the first end portion is movably connected to the clamp arm, such that the first end portion can be moved relative to the clamp arm. The support is connected to the second end portion of the slider, such that the support can be moved relative to the clamp arm.

11 Claims, 10 Drawing Sheets

MASSAGE DEVICE

FIELD OF THE INVENTION

The present invention relates to the technical field of medical and health devices, in particular to a massage device.

BACKGROUND OF THE INVENTION

Massage devices are a new generation of health care equipment developed based on physics, bionics, bioelectricity, traditional Chinese medicine and many years of clinical practice experience. It has a variety of simulation functions, which can relieve pressure, promote blood circulation, and treat joint pain. The most common among massage devices is the massage device for head-neck care.

Currently, in massage devices for head-neck care, the main massage assembly is arranged in the middle, and the front ends on both sides of the massage device are usually not provided with functional structures. In some situations, functional structures are provided, however, the positions of the functional structures are relatively fixed, making it difficult to simultaneously adjust functional structures to a comfortable position, resulting in poor user experience.

How to solve the above-mentioned problems needs to be considered by those skilled in the art.

SUMMARY OF THE INVENTION

In view of the above reasons, the object of the present invention is to provide a massage device, which is capable of extension and contraction, which is achieved through the following technical solutions:

A massage device includes a main body having a massage assembly, a clamp arm connected to the main body, a slider and a support. The slider includes a first end portion and a second end portion spaced apart from the first end portion, the first end portion is movably connected to the clamp arm, such that the first-end portion can be moved relative to the clamp arm. The support is connected to the second-end portion of the slider, such that the support can be moved relative to the clamp arm.

In a preferred embodiment, the clamp arm includes a first casing, the first casing having a passage formed along a first direction, and a positioning structure extending a second direction; the slider further includes a connection portion movably received in the passage, the first end portion and the second-end portion are connected to two opposite sides of the connection portion, the first-end portion is movably connected to the positioning structure during movement of the slider along the second direction.

In a preferred embodiment, the support includes a second casing, the second casing having a fixing hole formed along the first direction, the connection portion extending through the fixing hole, and the second end portion of the slider are arranged on the second casing, the connection portion is engaged in the fixing hole, such that the slider and the second casing can be moved together relative to the first casing.

In a preferred embodiment, the first end portion includes a positioning portion protruding along a third direction, the positioning structure comprises a locking strip and a guide strip, and the first end portion is arranged between the locking strip and the guide strip, the locking strip comprises a plurality of profiling grooves each matching the shape of the positioning portion, the profiling grooves are arranged along the second direction, the positioning portion is movably received in one of the profiling grooves.

In a preferred embodiment, the width of the first end portion along the third direction is greater than the width of the passage along the third direction, and the width of the second end portion along the third direction is greater than the width of the fixing hole along the third direction, the first end portion is on a side of the first casing away from the support, and the second portion is on a side of the second casing away from the clamp arm.

In a preferred embodiment, the clamp arm further includes an outer shell, a supporting piece and a connecting piece, the outer shell is fastened with the first casing to form a first accommodating cavity, the supporting piece, the connecting piece and the first end portion accommodated in the first accommodating cavity, the connecting piece is arranged between the supporting piece and the first casing, the supporting piece is detachably connected with the first casing, and the outer shell is arranged on a side of the supporting piece away from the connecting piece, and the first end portion is arranged on a side of the connecting piece away from the supporting piece.

In a preferred embodiment, the clamp arm further includes a control board, the control board is arranged between the connecting piece and the first casing, the control board is provided with a button contact on the side close to the connecting piece, and the connecting piece is provided with a pressing block capable of moving along the first direction, and the pressing block is arranged correspondingly to the button contact.

In a preferred embodiment, the support further includes a supporting shell, a positioning frame, a third casing, and a rubber covering layer, the supporting shell is arranged on a side of the second casing away from the first casing, and the positioning frame is arranged on the side of the supporting shell away from the second shell, the third shell is set on the side of the positioning frame away from the second shell, and the rubber covering layer is set on the third casing away from the second casing, the supporting shell is connected to the second casing, the positioning frame is arranged around the outer edge of the supporting shell and connected to the supporting shell, the third casing is connected to the positioning frame, and the rubber covering layer is connected to the third casing.

In a preferred embodiment, the support further includes a battery, a counterweight, and a heating sheet, the heating sheet is arranged on the side of the second casing away from the supporting casing, and the supporting shell cooperates with the third casing to form a second accommodating cavity, the number of the supports is two, the second accommodating cavity of one of the supports contains the battery, and the second accommodating cavity of the other one of the supports accommodates the counterweight.

In a preferred embodiment, the second end portion includes at least one abutting portion protruding toward the first end portion, and the abutting portion abuts to the second casing, such that there is a degree of rotation freedom for the second end portion at the second casing, and thus the angle of the support relative to the clamp arm can be fine-tuned.

In a preferred embodiment, the first end portion includes an elastic portion located between the positioning portion and the avoidance groove, and the avoidance groove and the elastic portion cooperatively allow the positioning portion to retract in a direction away from the profiling groove.

Compared with the prior art, in the massage device of the present application, the support is connected to the massage assembly through the clamp arm, the clamp arm and the support are movably connected through the slider, and the support and the slider remain relatively fixed, the slider reciprocates in the passage opened on the clamp arm, so that the clamp arm and the support can realize relative movement along a direction, such that realize the adjusting function of extension and contraction of the massage device.

BRIEF DESCRIPTION OF THE DRAWINGS

The accompanying drawings are used to provide a further understanding of the present invention, and constitute a part of the description, and are used to explain the present invention together with the embodiments of the present invention, and do not constitute a limitation to the utility model. In the attached drawings.

DETAILED DESCRIPTION OF PREFERRED EMBODIMENTS

Figure 1:
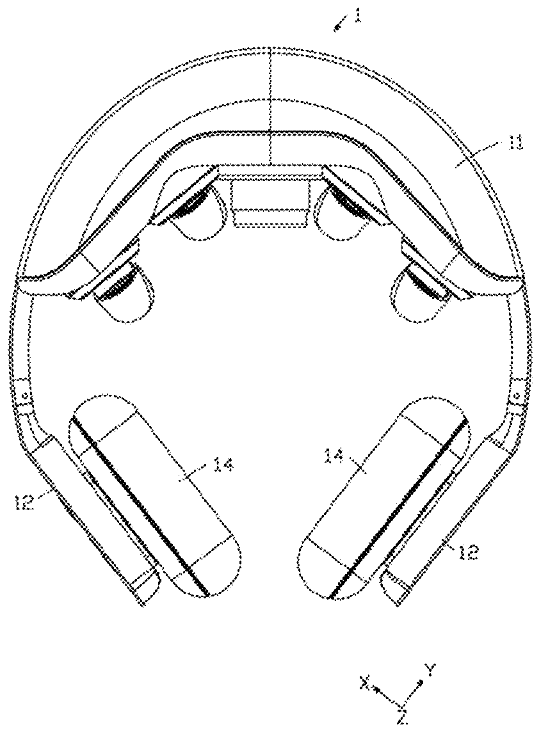
FIG. 1 is a schematic perspective view of a massage device according to an embodiment of the present invention.

The following description will refer to the accompanying drawings to fully describe the contents of the present application. Exemplary embodiments of the application are shown in the drawings. This application may, however, be embodied in many different forms and should not be construed as limited to the exemplary embodiments set forth herein. Rather, these exemplary embodiments are provided so that this application will be thorough and complete, and will fully convey the scope of this application to those skilled in the art. Like reference numerals designate the same or similar components.

The terminology used herein is for the purpose of describing particular exemplary embodiments only and is not intended to limit the application. As used herein, the singular forms "a", "an" and "the" are intended to include the plural forms as well, unless the context clearly dictates otherwise. Furthermore, when used herein, "comprises" and/or "comprises" and/or "has", integers, steps, operations, components and/or components, but does not exclude the presence or addition of one or more other features, Areas, integers, steps, operations, components and/or groups thereof.

Unless otherwise defined, all terms (including technical and scientific terms) used herein have the same meaning as commonly understood by one of ordinary skill in the art to which this application belongs. In addition, unless clearly defined herein, terms such as those defined in general dictionaries should be interpreted as having meanings consistent with their meanings in related technologies and the contents of this application, and will not be interpreted as idealized or overly formal.

The following content will describe exemplary embodiments with reference to the accompanying drawings. It should be noted that the components depicted in the referenced drawings are not necessarily shown to scale; and the same or similar components will be given the same or similar reference numerals or similar technical terms.

The specific embodiments of the present application will be further described in detail below with reference to the accompanying drawings.

As shown FIGS. 1-10, the embodiment of the present application provides a massage device 1, which includes a main body having a massage assembly 11, the massage assembly 11 includes a plurality of massage heads. The massage device 1 further includes components including clamp arm 12, slider 16 and support 14.

The clamp arm 12 is connected to the main body having the massage assembly 11.

The slider 16 includes a first end portion 161 and a second end portion 162 spaced apart from the first end portion 161, the first end portion 161 is movably connected to the clamp arm 12, such that the slider 16 can move reciprocally relative to the clamp arm 12.

The support 14 is connected to the second end portion 162, such that the support 14 is movably connected to the clamp arm 12 through the slider 16.

Referring to FIGS. 1-4, the embodiment of the present application provides a massage device 1, and the massage device 1 includes a main body having a massage assembly 11, a pair of clamp arms 12, a pair of supports 14 and two sliders 16.

The clamp arm 12 is connected to the main body with the massage assembly 11, the clamp arm 12 includes a first casing 121, the first casing 121 is provided with a passage 120 formed along a first direction X, the passage 120 extends along a second direction Y, the first casing 121 is provided with a positioning structure 122 extending along the second direction Y.

The slider 16 includes a first-end portion 161, a second-end portion 162 and a connecting section 163. The first-end portion 161 and the second-end portion 162 are respectively arranged on opposite two sides of the connecting section 163 along the first direction X. The connecting section 163 is disposed of through the passage 120, and the first end portion 161 is movably connected to the positioning structure 122, so that the slider 16 can reciprocate along the second direction Y.

The support 14 is movably connected to the clamp arm 12 through the slider 16. The support 14 includes a second casing 142, and the second casing 142 is provided with a fixing hole 141 formed along the first direction X, the connecting section 163 penetrates the fixing hole 141, and the fixing hole 141 is used to fix the connecting section 163 to the second casing 142.

In particular, the first end portion 161 is disposed on a side of the first casing 121 away from the support 14, and the second end portion 162 is disposed on a side of the second casing 142 away from the clamp arm 12.

Compared with the prior art, in the massage device 1 of the present application, the support 14 is connected to the massage assembly 11 through the clamp arm 12, and the clamp arm 12 and the support 14 are movably connected through the slider 16. The support 14 and the slider 16 remain relatively fixed along the second direction Y, and the slider 16 reciprocates in the passage 120 provided on the clamp arm 12 along the second direction Y, so that the clamp arm 12 and the support 14 can realize the movement along the second direction Y. The relative movement in the direction Y realizes the adjusting function of extension and contraction of the massage device 1.

Furthermore, the massage assembly 11 may be a part located at the middle of the main body of the massage device 1, and the massage assembly 11 may be provided with physical massage structures such as massage heads. When the user wears the massage device 1 on the neck, the massage assembly 11 can be arranged corresponding to the back neck to the side neck of the user. The number of clamp arms 12 is two, and the two clamp arms 12 are connected with the main body with the massage assembly 11 and extend to the side away from the massage assembly 11. When the user wears the massage device 1 on the neck, the clamp arm 12 can correspond to the user's side neck and extends to the front neck. The number of supports 14 is two, one support 14 is connected to one clamp arm 12, and the two supports 14 are arranged opposite to each other. When the user wears the massage device 1 on the neck, the side of the supports 14 away from the clamp arm 12 can be used to contact the front neck and side neck of the user. In a possible usage mode, the user wears the massage device 1 on the neck, sets the massage assembly 11 corresponding to the nape of the neck and keeps it relatively fixed, and then adjusts the relative position between the supports 14 and the clamp arm 12, in this way, the support 14 can be adjusted to a better position without adjusting the position of the massage assembly 11.

Figure 2:
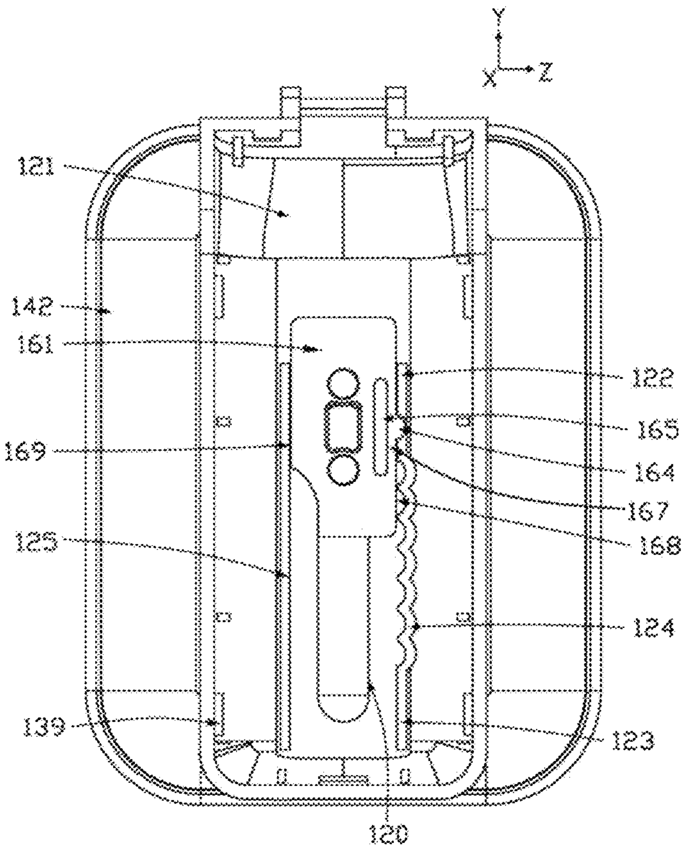
FIG. 2 is a schematic rear elevation view of an assembly of a slider, a first casing and a second casing according to an embodiment of the present invention.
Figure 3:
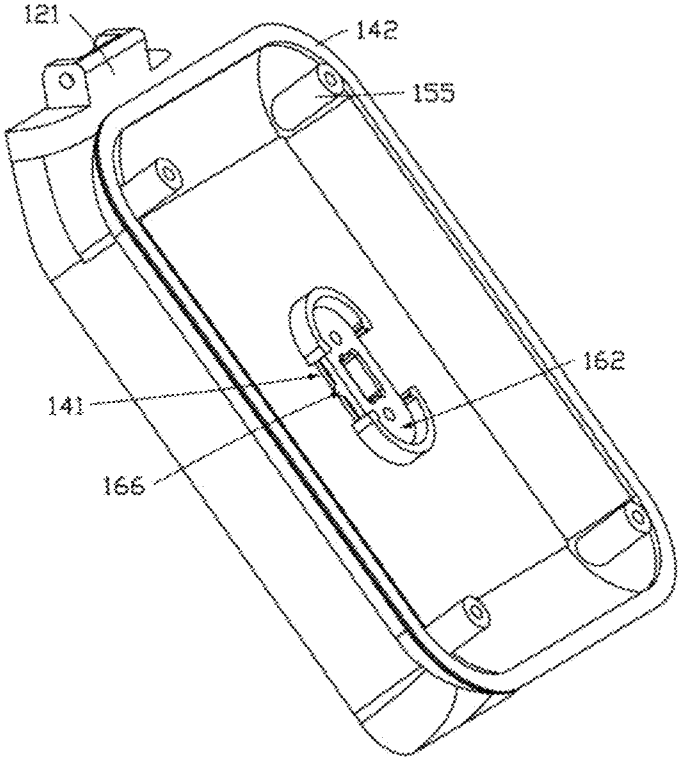
FIG. 3 is a schematic perspective view of an assembly of a slider, a first casing and a second casing according to an embodiment of the present invention.

Referring to FIGS. 2-3, in one embodiment, the width of the first end portion 161 along the third direction Z is greater than the inner width of the passage 120 along the third direction Z, and the width of the second end portion 162 along the third direction Z is greater than the inner width of the fixed hole 141 along the third direction Z.

Furthermore, the widths of the first end portion 161 and the second end portion 162 are both greater than the width of the connecting section 163, such that the slider 16 has a shape of thick at both ends and is thin in the middle. The connecting section 163 passes through both the passage 120 in the first casing 121 and the fixing hole 141 in the second casing 142 at the same time, the first end portion 161 is located on the side of the first casing 121 away from the second casing 142, and the second end portion 162 is disposed on a side of the second casing 142 away from the first casing 121, so as to realize the connection between the slider 16 and the first casing 121 and the second casing 142.

In this embodiment, the second end portion 162 can be integrated with the connection section 163, and the first end portion 161 can be detachably connected to the connection section 163, for example, through a conventional connection structure such as a bolt to achieve detachable connection. During the installation process, the connecting section 163 without the first end portion 161 is passed through the fixing hole 141 and the passage 120 in sequence along the first direction X, and then the first end portion 161 is fixed to the connecting section 163, thereby achieving assembly of the slider 16 with the first casing 121 and the second casing 142.

It can be understood that the size relationship between the widths of the first end portion 161 and the second end portion 162 along the third direction Z is not limited, and the widths of the first end portion 161 and the second end portion 162 along the third direction Z only need to be greater than the width of the connecting section 163 along the third direction Z.

In one embodiment, the first end portion 161 is provided with a positioning portion 164 that protrudes along the third direction Z, and the positioning structure 122 includes a locking bar 123 and a guide bar 125 arranged at intervals from opposite sides of the passage 120 along the third direction Z. The first end portion 161 is sandwiched between the locking bar 123 and the guide bar 125. The locking bar 123 is provided with a profiling groove 124 matching the shape of the positioning portion 164, and a plurality of profiling grooves 124 are arranged in sequence along the second direction Y, the positioning portion 164 is movably disposed of in one of the plurality of profiling grooves 124 along the second direction Y.

In this embodiment, the first casing 121 can be in the shape of a strip extending along the second direction Y, the passage 120 can also be in the shape of a strip extending in the second direction Y, and the locking strip 123 and the guide strip 125 can be extended parallel to the passage 120 along the second direction Y. The locking bar 123 and the guide bar 125 are arranged at intervals along the third direction Z from opposite sides of the passage 120, the first end portion 161 is arranged between the guide bar 125 and the locking bar 123, and the guide bar 125 and the locking bar 123 cooperates, so that the first end portion 161 can reciprocate in the passage 120 along the second direction Y, and the first end portion 161 further drives the connecting section 163, the second end portion 162 and the second casing 142 moves along the second direction Y relative to the first casing 121.

Furthermore, a plurality of profiling grooves 124 are provided on the locking strip 123, and the plurality of profiling grooves 124 are connected in sequence to form a continuous wave-shaped line segment. The positioning portion 164 protrudes from the first end portion 161 and is received in one of the profiling grooves 124. It can be understood that the plurality of profiling grooves 124 can be a plurality of gear positions during the movement of the support 14 relative to the clamp arm 12. When the positioning portion 164 is located in a profiling groove 124, the first casing 121 and the second casing 142 can be kept relatively fixed due to the limitation of the profiling groove 124 on the positioning portion 164, and the support 14 can keep relatively stationary with clamp arm 12 in situations without external driving force. However, when the support 14 is pushed and pulled by an external force along the second direction Y, the positioning portion 164 can be moved from one profiling groove 124 to the other profiling groove 124, and the first end portion 161 can be moved in the passage 120 along the second direction Y. That is, the user can adjust the support 14 to a proper position and maintain the proper position.

In one embodiment, the first end portion 161 is provided with an avoidance groove 165 formed therethrough along the first direction X, and the projection of the positioning portion 164 along the third direction Z completely falls into the avoidance groove 165, and the avoidance groove 165 is arranged between the positioning portion 164 and the passage 120. The minimum width of the avoidance groove 165 along the third direction Z is greater than the maximum width of the positioning portion 164 along the third direction Z.

Preferably, the first end portion 161 may be made of an elastically deformable material, or at least part of the first end portion 161 is made of elastically deformable material, in the present embodiment, an elastic portion 167 is arranged between the positioning portion 164 and the avoidance groove 165. The side of the positioning portion 164 away from the profiling groove 124 is provided with the hollow avoidance groove 165. When the support 14 is pushed and pulled by an external force along the second direction Y, the positioning portion 164 is pressed by the protruding part of the profiling groove 124, so that the positioning portion 164 and the elastic portion 167 connected with the positioning portion 164 move along the third direction Z to retract in a direction away from the profiling groove 124. The avoidance groove 165 provides an avoidance space for the retraction action, and the positioning portion 164 withdraws from a profiling groove 124. Subsequently, the first end portion 161 continues to move along the second direction Y by the external force until the positioning portion 164 corresponds to another profiling groove 124, and the elastic portion 167 returns to its original shape under the action of the elastic force and withdraws from the avoidance groove 165, thereby the positioning portion 164 is pushed into another profiling groove 124; thereby completing a movement of the first end portion 161 along the second direction Y.

In one embodiment, the first end portion 161 includes a first side 168 and an opposite second side 169 along the third direction Z. The positioning portion 164 protrudes from the first side 168 and towards away from the passage 120, and the projection of the positioning portion 164 along the first direction X is arc-shaped. Openings of the profiling grooves 124 are arranged toward the positioning portion 164 along the third direction Z. The second side 169 is parallel to the guide bar 125.

In this embodiment, the first side 168 is arranged adjacent to the locking bar 123, and the second side 169 is arranged adjacent to the guide bar 125, and the second side 169 and the guide bar 125 can be arranged in vertically parallel along the second direction Y. The projection of the positioning portion 164 along the first direction X is arc-shaped, correspondingly, the projection of the edge of the profiling groove 124 along the first direction X is arc-shaped. The size of the profiling groove 124 is slightly greater than that of the positioning portion 164. The center of the circle where the arc corresponding to the arc-shaped profiling groove 124 is located on the side of the locking bar 123 which is close to the first side 168, and the arc corresponding to the arc-shaped profiling groove 124 is at most one-half of the circle.

Figure 4:
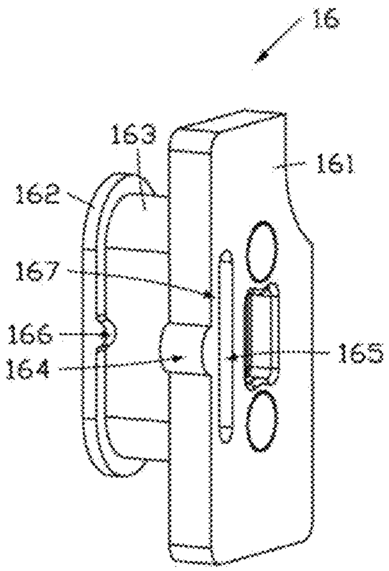
FIG. 4 is a schematic perspective view of a slider of the massage device according to an embodiment of the present invention.

Referring to FIG. 4, in one embodiment, the second end portion 162 is provided with an abutting portion 166 protruding toward the side of the first end portion 161, and the abutting portion 166 abuts to the second casing 142, such that there is a degree of movement freedom for the second end portion 162 at the second casing 142 along the first direction X.

In this embodiment, two abutting portions 166 are disposed on the second end portion 162, and the two abutting portions 166 are symmetrically disposed on opposite sides of the connecting section 163 along the third direction Z. When the second end portion 162 is fixed with the second casing 142, the abutting portion 166 is against the surface of the second casing 142 away from the first casing 121, such that a gap may exist between the second end portion 162 and the second casing 142. During use, the second end portion 162 can use the abutting portion 166 as a fulcrum, so that the second end portion 162 has a degree of freedom to rotate in the first direction X relative to the second casing 142, such that the angle of the support 14 relative to the clamp arm 12 can be fine-tuned, and the damage probability of the connecting portion between the support 14 and the clamp arm 12 can be reduced.

Furthermore, the second casing 142 is provided with a limiting wall 140 on a side away from the first casing 121, the limiting wall 140 protrudes from the second casing 142, and the limiting wall 140 is arranged around the fixing hole 141. The limiting wall 140 is used to accommodate the second end portion 162 and limit and protect the second end portion 162.

Figure 5:
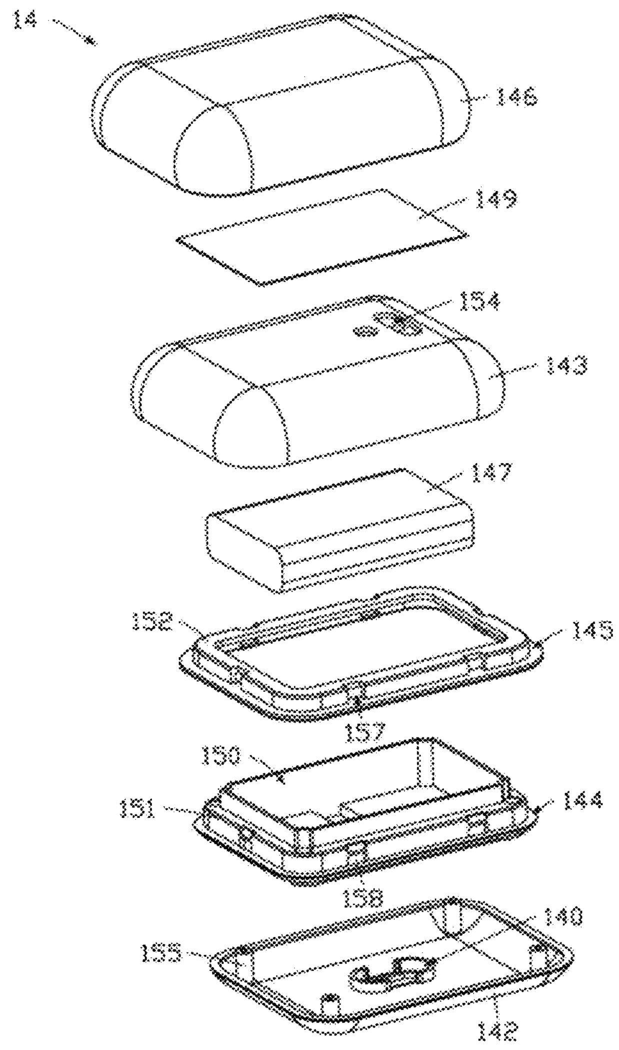
FIG. 5 is a schematic perspective exploded view of a support of the massage device according to an embodiment of the present invention.
Figure 6:
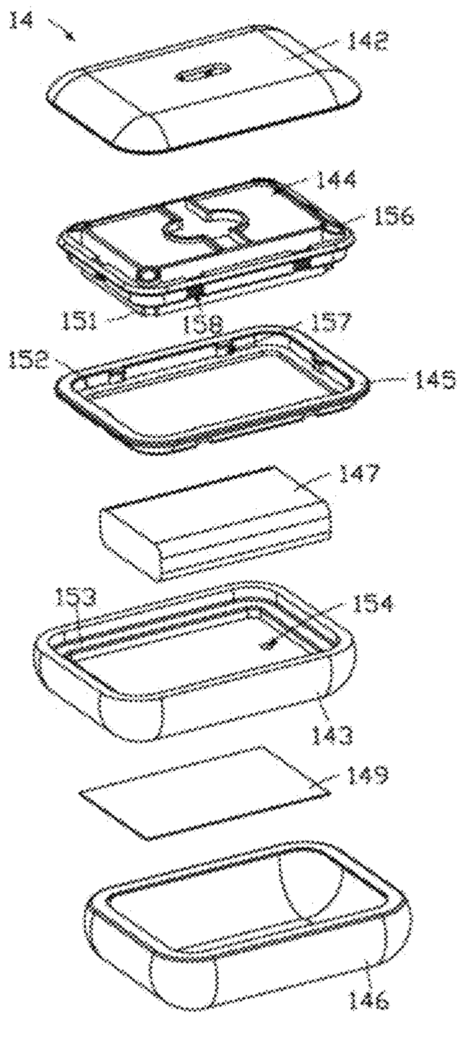
FIG. 6 is another schematic perspective exploded view of the support of the massage device of FIG. 5.
Figure 7:
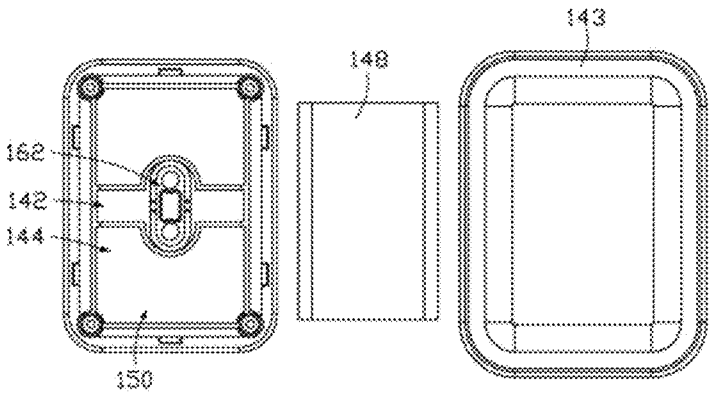
FIG. 7 is partially assembled view of the support of FIG. 5.

Referring to FIGS. 5-7, in one embodiment, the support 14 further includes a supporting shell 144, a positioning frame 145, a third casing 143 and a rubber covering layer 146. The supporting shell 144 is set on the side of the second casing 142 away from the first casing 121, the positioning frame 145 is set on the side of the supporting shell 144 away from the second casing 142, and the third casing 143 is set on the side of the positioning frame 145 away from the second casing 142. The rubber covering layer 146 is disposed on a side of the third casing 143 away from the second casing 142. The supporting shell 144 is connected with the second casing 142, the positioning frame 145 is arranged around the outer edge of the supporting shell 144 and connected with the supporting shell 144, the third casing 143 is connected with the positioning frame 145, and the rubber covering layer 146 is connected with the third housing 143

In one embodiment, the support 14 further includes a battery 147, a counterweight 148 and a heating sheet 149. The heating sheet 149 is disposed on a side of the second casing 142 away from the supporting casing 144, and the supporting shell 144 and the third casing 143 enclose to form a second accommodating cavity 150. In the present embodiment, there are two supports 14, the battery 147 is accommodated in the second accommodation chamber 150 of one of the supports 14, and the counterweight 148 is accommodated in the second accommodation chamber 150 of the other one of the supports 14.

In this embodiment, the second casing 142 is provided with positioning posts 155 on one side of the limiting wall 140, and the four positioning posts 155 can be arranged on the four corners of the second casing 142, and four positioning holes 156 are formed on one side of the supporting shell 144 faces the second casing 142. The second casing 142 and the supporting shell 144 are stacked, and each of the positioning posts 155 is correspondingly arranged in a positioning hole 156, and the second casing 142 and the supporting shell 144 are fixed by bolts through the positioning holes 156 and the positioning posts 155.

In this embodiment, a first-stepped structure 151 is formed on a side of the supporting shell 144 away from the second casing 142, and a plurality of second buckles 158 are disposed on the first-stepped structure 151. The positioning frame 145 is an annular structure, and the edge of the positioning frame 145 is designed as a second-stepped structure 152 matching the first-stepped structure 151, and a plurality of second claws 157 are arranged on the second-stepped structure 152. The positioning frame 145 is arranged on the side of the supporting shell 144 away from the second casing 142, the first-stepped structure 151 is matched with the second-stepped structure 152, and the second claw 157 is engaged with the second buckle 158 to realize fixing of the positioning frame 145 and the supporting shell 144.

In this embodiment, a second accommodating cavity 150 is formed on a side of the supporting shell 144 away from the second casing 142, and the positioning frame 145 is disposed around the outside of the second accommodating cavity 150. The second accommodating chamber 150 is used for accommodating the battery 147 or the counterweight 148. It can be understood that the battery 147 and the counterweight 148 may have substantially similar shapes and weights.

In this embodiment, the third casing 143 is provided with a third-stepped structure 153 matching the second-stepped structure 152 on the side facing the positioning frame 145, the third casing 143 is connected with the positioning frame 145, and makes the second-stepped structure 152 and the third-stepped structure 153 matched and fastened. The third casing 143 cooperates with the supporting shell 144 to accommodate the battery 147 or the counterweight 148. The third casing 143 is also provided with a locking hole 154 formed therethrough, the locking hole 154 communicates with the second accommodating cavity 150, and a bolt (not shown) passing through the locking hole 154 can be provided to extend the bolt to the second housing chamber 150 to abut against the battery 147 or the counterweight 148 to realize the fixing of the battery 147 and the counterweight 148.

In this embodiment, the heating sheet 149 is disposed on the side of the third casing 143 away from the supporting shell 144, and the third casing 143 may be provided with a groove (not shown) for accommodating the heating sheet 149. The rubber covering layer 146 is disposed on a side of the third casing 143 away from the second casing 142, and the rubber covering layer 146 covers the third casing 143 and touches the heating sheet 149.

Figure 8:
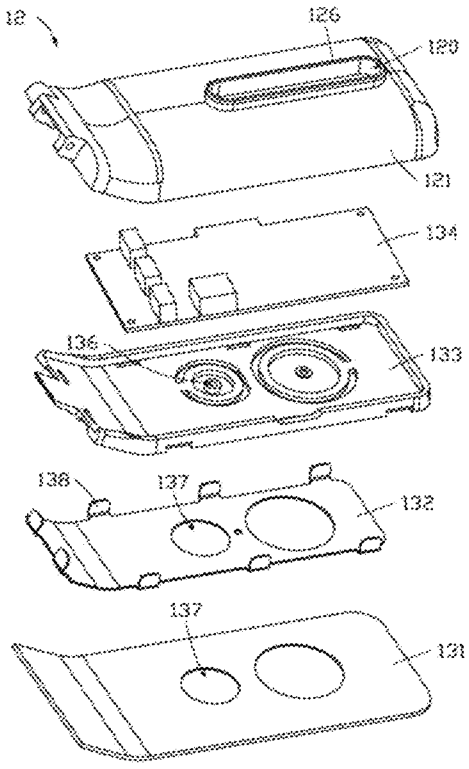
FIG. 8 is a schematic perspective exploded view of a clamp arm with a control board of the massage device according to an embodiment of the present invention.
Figure 9:
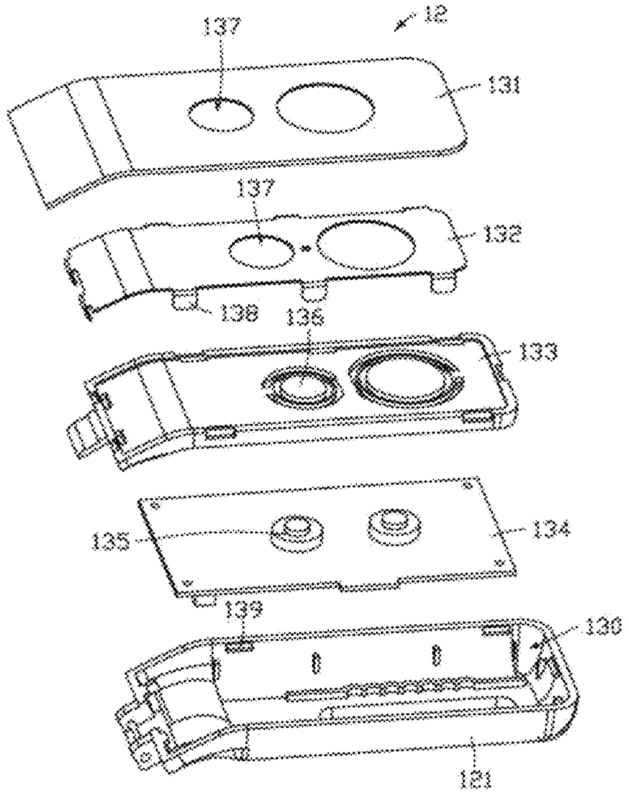
FIG. 9 is another schematic perspective exploded view of the clamp arm of FIG. 8.
Figure 10:
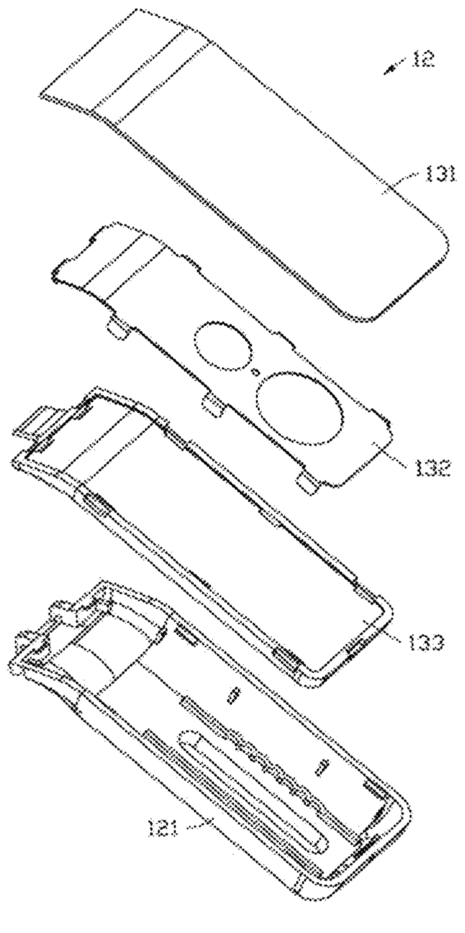
FIG. 10 is a schematic perspective exploded view of a clamp arm without a control board of a massage device according to an embodiment of the present invention.

Referring to FIGS. 8-10, in one embodiment, the first casing 121 is provided with a raised guide wall 126 facing the side of the second casing 142, and the raised guide wall 126 is arranged around the periphery of the passage 120, and the raised guide wall 126 can be used for the protection and guidance of the connecting section 163, and can also improve the appearance of the massage device 1.

In one embodiment, the clamp arm 12 further includes an outer shell 131, a supporting piece 132 and a connecting piece 133. The outer shell 131 is fastened with the first casing 121 to form the first accommodating cavity 130, and the supporting piece 132, the connecting piece 133 and the first end portion 161 are accommodated in the first accommodating cavity 130. The connecting piece 133 is arranged between the supporting piece 132 and the first casing 121, the supporting piece 132 is detachably connected with the first casing 121, the outer shell 131 is arranged on the side of the supporting piece 132 away from the connecting piece 133, and the first end portion 161 is disposed on a side of the connecting piece 133 away from the supporting piece 132.

In this embodiment, the support piece 132 is provided with a plurality of first claws 138 protruding on the side facing the first casing 121, and the side of the first casing 121 away from the second casing 142 is provided with a plurality of first buckles 139, the supporting piece 132 is buckled with the first casing 121, and the first claw 138 is buckled with the first buckle 139, so that the supporting piece 132 is connected with the first casing 121. The outer shell 131 is disposed on a side of the supporting piece 132 away from the first casing 121 to cover the supporting piece 132 and the connecting piece 133 is accommodated in the first accommodating cavity 130.

As shown in FIGS. 8-9, one of the two clamp arms 12 is provided with a control board 134 to realize the control and adjustment function. In one embodiment, the clamp arm 12 further includes a control board 134 disposed between the connecting piece 133 and the first casing 121. The control board 134 is provided with a button contact 135 near the connecting piece 133, and the connecting piece 133 is provided with a pressing block 136 movable along the first direction X, and the pressing block 136 is arranged correspondingly to the button contact 135.

In this embodiment, the position of the supporting piece 132 and the outer shell 131 corresponding to the pressing block 136 is provided with a pressing opening 137, and the pressing opening 137 exposes the pressing block 136, so that the user can trigger the control board 134 to generate a corresponding control electrical signal. It can be understood that a battery 147 is provided in the support 14 which is connected to the clamp arm 12 provided with the control board 134, and a counterweight 148 is provided in the other support 14, which is connected with the clamp arm 12 without the control board 134.

As shown in FIG. 10, in the clamp arm 12 without the control board 134, the outer shell 131 may not be provided with the pressing opening 137 to improve the appearance.

Hereinbefore, specific embodiments of the present application have been described with reference to the accompanying drawings. However, those skilled in the art can understand that without departing from the scope of the application, various changes and substitutions can be made to the specific embodiments of the application.

What is claimed is:

1. A massage device, comprising:

a main body having a massage assembly;

a clamp arm connected to the main body;

a slider comprising a first end portion and a second end portion spaced apart from the first end portion, the first end portion is movably connected to the clamp arm, such that the first end portion is movable relative to the clamp arm; and a support connected to the second end slider, such that the support is movable relative to the clamp arm;

wherein the clamp arm comprises a first casing, the first casing having a passage formed along a first direction, and a positioning structure extending a second direction; the slider further comprises a connection portion movably received in the passage, the first end portion and the second end portion are connected to two opposite sides of the connection portion, the first end portion is movably connected to the positioning structure during movement of the slider along the second direction;

wherein the first end portion comprises a positioning portion protruding along a third direction, the positioning structure comprises a locking strip and a guide strip, and the first end portion is arranged between the locking strip and the guide strip, the locking strip comprises a plurality of profiling grooves each matching the shape of the positioning portion, the plurality of profiling grooves are arranged along the second direction, the positioning portion is movably received in one of the plurality of profiling grooves; and wherein the first end portion comprises an avoidance groove formed therethrough along the first direction, the avoidance groove is arranged between the positioning portion and the passage, the projection of the positioning portion along the third direction completely falls into the avoidance groove, and a width of the avoidance along the third direction is greater than a width of the positioning portion along the third direction.

2. The massage device according to claim 1, wherein the support comprises a second casing, the second casing having a fixing hole formed along the first direction, the connection portion extending through the fixing hole, and the second end portion of the slider are arranged on the second casing, the connection portion is engaged in the fixing hole, such that the slider and the second casing are movable together relative to the first casing.

3. The massage device according to claim 1, wherein the first end portion comprises a first side and an opposite second side, the positioning portion are formed at the first side and protrudes away the passage, openings of the plurality of profiling grooves face the positioning portion, and the second side is guided by the guide strip.

4. The massage device according to claim 2, wherein the width of the first end portion along the third direction is greater than the width of the passage along the third direction, and the width of the second end portion along the third direction is greater than the width of the fixing hole along the third direction, the first end portion is on a side of the first casing away from the support, and the second portion is on a side of the second casing away from the clamp arm.

5. The massage device according to claim 1, wherein the clamp arm further comprises an outer shell, a supporting piece and a connecting piece, the outer shell is fastened with the first casing to form a first accommodating cavity, and the supporting piece, the connecting piece and the first end portion are accommodated in the first accommodating cavity, the connecting piece is arranged between the supporting piece and the first casing, the supporting piece is detachably connected with the first casing, and the outer shell is arranged on a side of the supporting piece away from the connecting piece, and the first end portion is arranged on a side of the connecting piece away from the supporting piece.

6. The massage device according to claim 5, wherein the clamp arm further comprises a control board, the control board is arranged between the connecting piece and the first casing, the control board is provided with a button contact on the side close to the connecting piece, and the connecting piece is provided with a pressing block capable of moving along the first direction, and the pressing block is arranged correspondingly to the button contact.

7. The massage device according to claim 2, wherein the support further comprises a supporting shell, a positioning frame, a third casing, and a rubber covering layer, the supporting shell is arranged on a side of the second casing away from the first casing, and the positioning frame is arranged on a side of the supporting shell away from the second casing, the third casing is set on the side of the positioning frame away from the second casing, and the rubber covering layer is set on the third casing away from the second casing, the supporting shell is connected to the second casing, the positioning frame is arranged around the outer edge of the supporting shell and connected to the supporting shell, the third casing is connected to the positioning frame, and the rubber covering layer is connected to the third casing.

8. The massage device according to claim 7, wherein the support further comprises a battery, a counterweight, or a heating sheet, the heating sheet is arranged on the side of the second casing away from the supporting shell, and the supporting shell cooperates with the third casing to form a second accommodating cavity, and the second accommodating cavity contains the battery or the counterweight.

9. The massage device according to claim 4, wherein the second end portion comprises at least one abutting portion protruding toward the first end portion, and the abutting portion abuts to the second casing, such that there is a degree of rotation freedom for the second end portion at the second casing, thereby an angle of the support relative to the clamp arm is fine-tuned.

10. The massage device according to claim 1, wherein the first end portion comprises an elastic portion located between the positioning portion and the avoidance groove, the avoidance groove and the elastic portion cooperatively allows the positioning portion to retract in a direction away from the profiling groove.

11. A massage device, comprising:

a main body having a massage assembly;

a clamp arm connected to the main body;

a slider comprising a first end portion and a second end portion spaced apart from the first end portion, the first end portion is movably connected to the clamp arm, such that the first end portion is movable relative to the clamp arm; and a support connected to the second end portion of the slider, such that the support is movable relative to the clamp arm;

wherein the clamp arm comprises a first casing, the first casing having a passage formed along a first direction, and a positioning structure extending a second direction; the slider further comprises a connection portion movably received in the passage, the first end portion and the second end portion are connected to two opposite sides of the connection portion, the first end portion is movably connected to the positioning structure during movement of the slider along the second direction;

wherein the support comprises a second casing, the second casing having a fixing hole formed along the first direction, the connection portion extending through the fixing hole, and the second end portion of the slider are arranged on the second casing, the connection portion is engaged in the fixing hole, such that the slider and the second casing can be moved together relative to the first casing; and wherein the support further comprises a supporting shell, a positioning frame, a third casing, and a rubber covering layer, the supporting shell is arranged on a side of the second casing away from the first casing, and the positioning frame is arranged on the side of the supporting shell away from the second shell, the third shell is set on the side of the positioning frame away from the second shell, and the rubber covering layer is set on the third casing away from the second casing, the supporting shell is connected to the second casing, the positioning frame is arranged around the outer edge of the supporting shell and connected to the supporting shell, the third casing is connected to the positioning frame, and the rubber covering layer is connected to the third casing.

* * * * *